(12) United States Patent
Sackett et al.

(10) Patent No.: US 7,047,051 B2
(45) Date of Patent: May 16, 2006

(54) METHOD OF AND ARRANGEMENT FOR MINIMIZING POWER CONSUMPTION AND DATA LATENCY OF AN ELECTRO-OPTICAL READER IN A WIRELESS NETWORK

(75) Inventors: William Sackett, Rocky Point, NY (US); Adam Levine, Huntington Station, NY (US); Sean Connolly, Stony Brook, NY (US); Anthony Biuso, South Setauket, NY (US); Stephen Shellhammer, Lake Grove, NY (US); Frank Boccuzzi, Brooklyn, NY (US); Kevin Cordes, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 447 days.

(21) Appl. No.: 10/280,557

(22) Filed: Oct. 25, 2002

(65) Prior Publication Data

US 2003/0087681 A1    May 8, 2003

Related U.S. Application Data

(60) Provisional application No. 60/345,289, filed on Oct. 25, 2001.

(51) Int. Cl.
*H04B 1/38* (2006.01)

(52) U.S. Cl. ............... 455/574; 455/343.1; 455/343.2; 455/41.2; 455/412.2; 235/462.14; 235/462.45; 235/462.46; 235/472.01

(58) Field of Classification Search ............... 455/574, 455/343.1–343.5, 556.1, 41.2, 412.2; 340/7.22, 340/10.1, 636.19; 235/462.14, 462.15, 462.45, 235/462.46, 472.01
See application file for complete search history.

(56) References Cited

U.S. PATENT DOCUMENTS

| | | | | |
|---|---|---|---|---|
| 5,940,771 | A * | 8/1999 | Gollnick et al. | 455/517 |
| 6,144,848 | A * | 11/2000 | Walsh et al. | 455/419 |
| 6,540,144 | B1 * | 4/2003 | Hudrick et al. | 235/462.15 |
| 2001/0035459 | A1 * | 11/2001 | Komai | 235/462.25 |
| 2002/0008145 | A1 * | 1/2002 | Walsh et al. | 235/462.46 |
| 2002/0075940 | A1 * | 6/2002 | Haartsen | 375/132 |
| 2002/0198851 | A1 * | 12/2002 | Hashimoto et al. | 705/400 |
| 2003/0078036 | A1 * | 4/2003 | Chang et al. | 455/419 |
| 2004/0179547 | A1 * | 9/2004 | Kuffner et al. | 370/465 |

* cited by examiner

*Primary Examiner*—George Eng
*Assistant Examiner*—Dai Phuong
(74) *Attorney, Agent, or Firm*—Kirschstein, et al.

(57) ABSTRACT

Battery power consumption and data transfer latency of an electro-optical reader in a wireless network are minimized by turning a radio off in a default state, and by turning the radio on only after the reader has generated data to be transferred along the network.

14 Claims, 2 Drawing Sheets

METHOD OF AND ARRANGEMENT FOR MINIMIZING POWER CONSUMPTION AND DATA LATENCY OF AN ELECTRO-OPTICAL READER IN A WIRELESS NETWORK

CROSS REFERENCE TO RELATED APPLICATIONS

This application claims the priority benefit of U.S. provisional patent application Ser. No. 60/345,289, filed Oct. 25, 2001.

BACKGROUND OF THE INVENTION

1. Field of the Invention

This invention relates to a method of and an arrangement for minimizing power consumption of a battery-operated, wireless reader for electro-optically reading machine-readable indicia such as bar code symbols, and of minimizing latency of data generated by, and transferred from, the reader to a wireless data collection terminal remote from the reader and in wireless communication therewith over a short range network, especially a Bluetooth network in which the reader and the terminal are Bluetooth-compatible devices in compliance with Bluetooth standard, version 1.1.

2. Description of the Prior Art

A reader for electro-optically reading machine-readable indicia such as bar code symbols, both one- and two-dimensional, is well known in the art. In applications requiring portability, the reader is typically held in an operator's hand and aimed at a symbol to be read. A trigger on the reader is manually actuated by the operator to initiate reading. In one type of reader, a light beam is projected from the reader and swept by a scanner across the symbol for reflection therefrom, a detector detects the light reflected from the symbol and generates an electrical signal indicative of the symbol, and signal processing circuitry digitizes and decodes the signal into data related to the symbol. In another type of reader, the field of view of the detector is swept by the scanner. In still another type of reader, an imager, such as a two-dimensional, solid-state, charge coupled device (CCD) array captures an entire image of the symbol, and the image is then processed to obtain the data related to the symbol. In each case, the data is sent to a remote host, for example, a data collection terminal, to access a database for retrieval of information, such as price, in real time.

Again, for reasons of enhancing portability, it is known to eliminate electrical power and data cables between the reader and the host. Thus, a battery, typically rechargeable, is mounted in the hand-held reader, in order to eliminate the power cable. Also, a wireless transceiver is mounted in the reader and the host to transmit the data and receive the retrieved information, in order to eliminate the data cable.

As advantageous as the use of batteries are, experience has shown that they are unsatisfactory in certain applications. Thus, in the case of tracking mail and parcel deliveries, a delivery person typically actuates a hand-held, battery-operated reader to read a bar code symbol on each item to be delivered. Each symbol can be read multiple times, for example, at the pick-up point, at various transfer places en route to a destination, and at the destination, all for the purpose of providing real time tracking of the delivery. The reader has electrical components which consume power and, over the course of a day, for example, a six-hour shift, the battery weakens and discharges. The battery could be recharged, but this requires down-time during which the reader is unusable. A spare battery could be used as a replacement, but this represents still another accessory to be carried and possibly misplaced. A larger battery would not discharge as quickly as a smaller one, but the larger battery adds extra weight and, again, is not a satisfactory answer to the delivery person who wishes to lighten his or her load, particularly if the reader is a wearable device such as a finger-mounted reader.

The use of wireless transceivers has also proven unsatisfactory in certain cases. Thus, the time it takes for data generated by the reader to be delivered to the host, as well as the time it takes for an acknowledgment signal to be received at the reader from the host, should be minimized. This time, also known as data latency, is desired to be as small as possible in order to provide the delivery person with positive feedback as quickly as possible.

SUMMARY OF THE INVENTION

Objects of the Invention

Accordingly, it is an object of this invention to minimize power consumption and to minimize data latency of a battery-operated, wireless reader.

Another object is to increase the working lifetime of a battery used to power handheld, electro-optical readers.

Still another object is to provide fast, positive feedback to an operator that the data has been received at the host.

FEATURES OF THE INVENTION

In keeping with these objects, and others which will become apparent hereinafter, one feature of this invention resides, briefly stated, in a method of, and an arrangement for, minimizing power consumption of a battery-operated, wireless reader for electro-optically reading machine-readable indicia, such as bar code symbols, and minimizing latency of data generated by, and transferred from, the reader to a wireless host or data collection terminal remote from the reader.

In accordance with this invention, a wireless network is established between the reader and the terminal by incorporating a controller and a radio in each of the reader and the terminal. In the preferred embodiment, each controller and radio are configured as Bluetooth-compatible devices in compliance with Bluetooth standard, version 1.1, which cooperate to set the network up as a piconet.

The Bluetooth wireless specification is a known standard which operates in the unlicenced 2.4 GHz radio frequency band using a spread spectrum, frequency hopping, time division duplex signal at up to 1600 hops per second. The signal hops among 79 frequencies at 1 MHz intervals to give immunity to interference. Up to 7 simultaneous connections can be established and maintained. The Bluetooth specification, version 1.1, published Feb. 22, 2001 is found in its entirety at www.bluetooth.com, and the entire contents thereof are incorporated herein by reference.

The Bluetooth system includes a 2.4 GHz radio and a controller in each device to be networked. As used herein, the controller includes a link control unit and a support unit for link management and host terminal interface functions. The controller carries out baseband protocols and other low-level link routines.

The Bluetooth system provides a point-to-point connection, or a point-to-multipoint connection. A channel is shared among all the devices to be networked. Two or more devices sharing the same channel form a piconet. The Bluetooth device that initiates the connection is called the master. The master characterizes the channel, the frequency hopping sequence, the channel access code, the timing and phase of the hopping sequence, and controls the traffic on the channel by a polling scheme. The other devices on the piconet are called the slaves. Once a piconet has been established, master-slave roles can be exchanged since each device has the same controller and radio.

In accordance with one embodiment of this invention, the terminal is operated as a master and periodically transmits radio frequency signals and listens for radio frequency responses. The reader is operated to read indicia in a reading mode in which data related to the indicia is generated.

The radio in the reader is commanded by the controller in the reader to enter a low power mode when the reader is not in the reading mode, thereby minimizing power consumption of the reader and increasing the working lifetime of the battery used to power the reader. The controller in the reader also instructs the radio in the reader to automatically enter a full power mode when the reader is in the reading mode and has data to send.

The reader is operated as a slave and receives the signals transmitted by the master. Once the radio has entered the full power mode and after receipt of one of the signals transmitted by the master, the slave automatically transfers the data generated by the reader to the master, thereby minimizing the time taken to transmit the data from the slave to the master.

The master acknowledges receipt of the data by sending an acknowledgment signal to the slave. An indicator, for example, a beeper, on the slave alerts the operator that the acknowledgment signal has been sent. Thus, the total time or latency taken to transmit the data from the slave to the master, and to alert the operator upon receipt of the acknowledgment signal from the master to the slave, is minimized. A prompt, aggressive feedback promotes system use.

There are three known standard power savings modes in the Bluetooth network, namely park, hold and sniff modes. In the hold mode, a Bluetooth radio neither transmits nor receives. When returning to normal operation after a hold mode in a slave Bluetooth device, the slave must listen for the master before it can send information. A slave in the park or sniff modes periodically wakes up to listen to transmissions from the master.

Each of these known modes gain their power savings by increasing data latency. This shortcoming is unacceptable for a reader to be connected to a Bluetooth network, because an operator, after actuating a trigger to initiate reading of a symbol, does not want to wait too long before hearing the acknowledgment beep signifying that the master confirms receipt of data indicative of the symbol. This is especially true in the case where the operator is a delivery person who has a busy schedule to keep.

In accordance with another embodiment of this invention, the terminal is operated as a slave by listening for connection establishment signals, and the reader is operated as a master by transmitting a radio frequency signal from the reader to the terminal to establish a wireless network between the master and the slave as a piconet. The radio frequency signal is transmitted by the reader after the reader has generated the data and entered the full power mode and after the piconet has been established.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings. Further features of the invention are set out in the appended independent claims, and further preferred features are set out in the dependent claims.

DETAILED DESCRIPTION OF THE PREFERRED EMBODIMENTS

Figure 1:
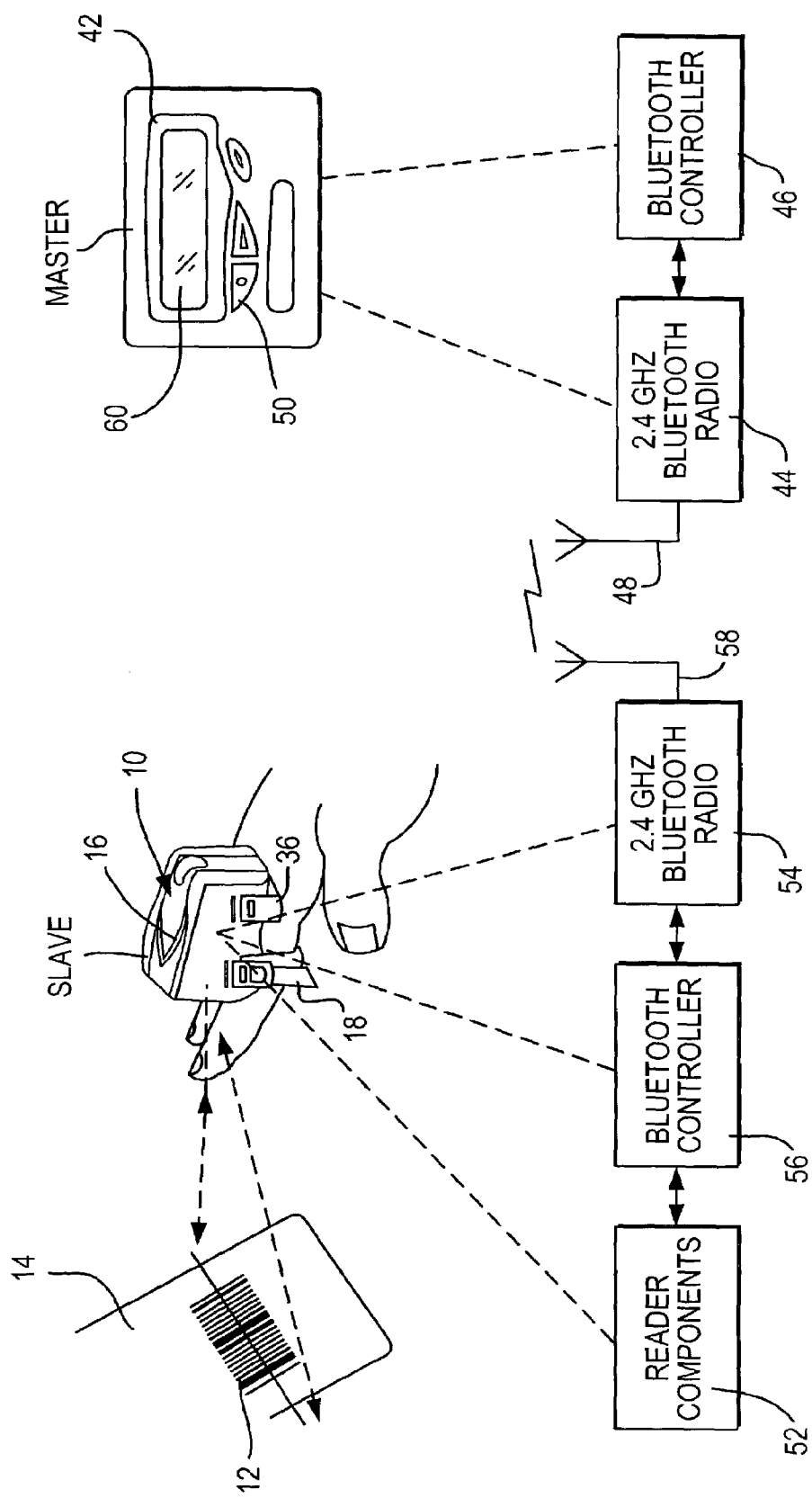
FIG. 1 is a schematic view of a first embodiment of an electro-optical reader for reading bar code symbols in wireless communication over a Bluetooth piconet with a data collection terminal.

Referring to FIG. 1, reference numeral 10 identifies a battery-operated, wireless reader for electro-optically reading machine-readable indicia, such as a bar code symbol 12 printed on a label applied to an item, such as a parcel 14 to be delivered. The reader 10 is miniature and includes a housing 16 mounted on an operator's hand. In this case, a strap 18 holds the housing 16 on the backs of two of the operator's outstretched fingers which are pointing towards the symbol 12 during a reading mode of operation, as illustrated.

Figure 2:
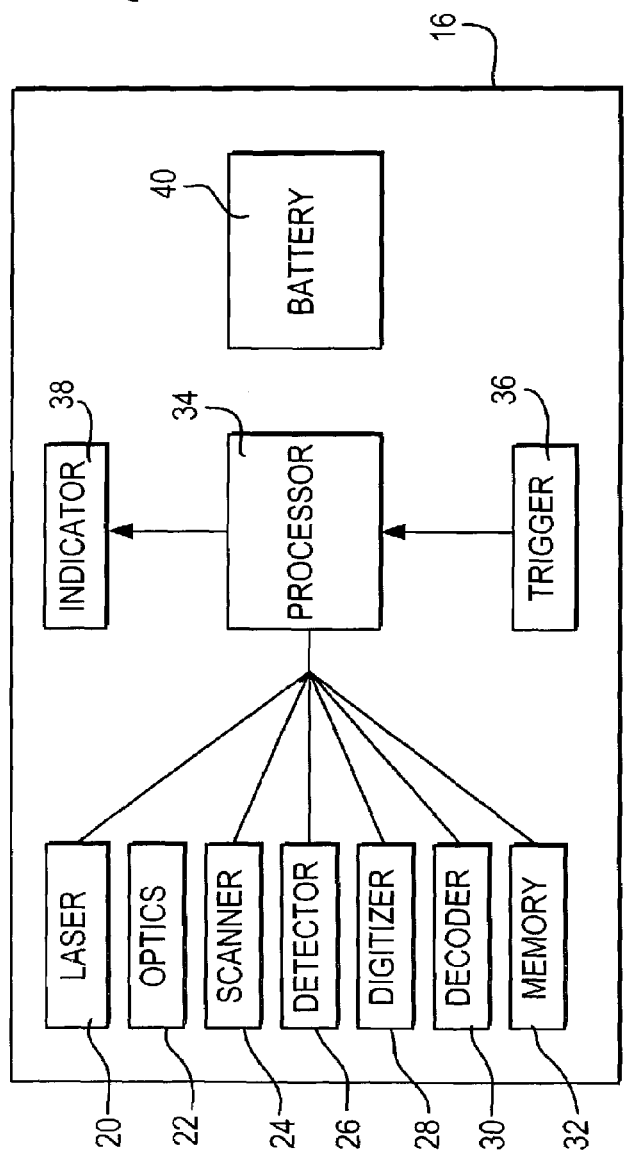
FIG. 2 is a schematic view of major components of the reader of FIG. 1.

The components illustrated in FIG. 2 are supported by the housing 16 of the reader. The components include a light source such as a laser 20 for emitting a light beam, an optical assembly 22 including a focusing lens for focusing the light beam at a focal point exteriorly of the housing, a scanner 24 for sweeping the light beam along a scan direction across the symbol, a light detector 26, typically a photodiode, for detecting at least a portion of the light of variable intensity that is scattered and reflected off the symbol, a digitizer 28 for digitizing an analog electrical signal generated by the detector, a decoder 30 for decoding a digitized signal generated by the digitizer in accordance with an algorithm, a memory 32 for storing the data, a processor 34 for controlling the operation of all the other electrical components, a trigger 36 (also, see FIG. 1) for initiating reading when manually depressed, an indicator 38, typically a beeper, for generating an audible sound for the operator, and a battery 40 for supplying power to all of the electrical components in the reader.

In use, the operator aims the housing at the symbol 12, depresses the trigger 36, for example, with the thumb, and the processor 34 actuates the laser 20 whose light beam is focused by the optics and swept by the scanner in a scan pattern across the symbol. The reflected light is detected by the detector, and the resulting signal is digitized by the digitizer and decoded by the decoder. The decoded signal may be stored in memory for subsequent download, or immediately transferred away from the housing, usually with the aid of a wireless transceiver, to a remote host.

The components of the reader and their operation, as just described, are entirely conventional and are well known in the art. Other variations on the known electro-optical readers include the sweeping not of the light beam, but of the field of view of the detector; the use of a two-dimensional, solid-state imager, instead of a photodiode detector in order to capture an entire image of the symbol; the generation not of a single scan line as shown in FIG. 1, but of a multi-line pattern; the use of automatic object sensing, rather than a trigger; and the shaping of the housing so as to be configured and mounted on a single finger, or to be held in the operator's gripped hand.

In all of these variations and others, the reader is used to read indicia, is powered by an on-board battery, and generates data which is to be transferred over a wireless network away from the housing. This invention is concerned, as described above, with minimizing the power consumption of the battery for a longer working lifetime and with minimizing the latency of the data transferred from the housing over a wireless network.

For these aims, the reader and the host are configured as Bluetooth-compatible devices, as described above. As shown in FIG. 1, the host is a data collection terminal 42 having function keys 50 and a display 60. A 2.4 GHz Bluetooth radio 44 and a Bluetooth controller 46 are mounted in the terminal 42. An antenna 48 is connected to the radio 44. The reader 10 includes the aformentioned components of FIG. 2, collectively depicted as block 52, a 2.4 GHz Bluetooth radio 54, a Bluetooth controller 56, and an antenna 58. Together, the reader 20 and the terminal 42 form a point-to-point connection and share the same channel over a piconet in which the terminal 42 acts as the master of the piconet, and in which the reader 10 acts as the slave of the piconet.

In normal Bluetooth operation, the master controls when the slave can transmit data. The slave can only send data in response to a signal sent to it by the master. During normal operation, the master continuously attempts to communicate with the slave by transmitting the signal in packet form and listening for a response. In the above-described park, hold and sniff modes, the master only sends a signal to the slave at fixed intervals. If these intervals are large, then the power consumption of the slave (i.e., the reader) will be small since its radio 54 will be off most of the time. However, the latency of data transfer will be large since the slave (or reader) must wait a long time to communicate with the master. If the intervals are small, then the latency will be small, but the power consumption of the slave (or reader) will be large since the slave radio 54 will be on most of the time.

In accordance with this first embodiment of the invention, a new operational mode that allows both low power and low data latency is activated in the slave radio 54 of the reader by using a vendor-specific, custom, host control interface (HCI) command. The slave controller 56 sends the HCI command in packet form to the slave radio 54. The HCI command contains two parameters to specify the duty cycle, namely the "wake time" during which the slave is actively listening for signals from the master, and the "sleep time" during which the slave is not listening for signals from the master.

In this new mode, the master operates normally by continuously trying to communicate with the slave. However, if the reader has no data to send to the master, that is, the reader has not read a symbol, then the slave will respond at fixed time intervals or the wake times specified by the HCI command. In fact, the slave will not even attempt to listen for signals from the master during the sleep times. In this way, the slave radio 54 can be completely turned off (except for a low power oscillator), thus saving a large amount of power from the battery 40. The wake times, however, must be sufficient to allow the slave to stay synchronized with the master.

When the reader has data to send to the master, for example, after a symbol has been read in the reading mode, the slave controller 56 turns the slave radio 54 on and attempts to immediately send the data to the master once the slave radio receives a signal from the master. Since the master is continuously trying to communicate with the slave, it will be a very short time before the slave receives the master's signal and is able to send the data to the master. Thus, the latency will be quite small.

The master may store the data sent to it, or send the data along to still another access point or server on the network. The data may be used to access a database and retrieve data resources. No matter where the data is eventually sent, a successful transmission of the data is acknowledged by having the master send an acknowledgment signal back to the slave. Upon receipt of the acknowledgment signal, the indicator 38 alerts the operator that the symbol was successfully read and sent to the remainder of the network. Due to the short latency of the data transmission from the slave to the master, the overall latency of the data transmission and receipt is also minimized, thus providing the arrangement with a fast, aggressive response time.

After the data has been sent, the reader can then return to the low duty cycle specified by the wake time and the sleep time of the HCI command. Thus, the reader maintains its communications link with the terminal through a low duty cycle response, but the reader is free to immediately send data to the terminal when the data is available.

The master in this new low duty cycle mode must remain active at all times. This requires the master to have a long-lived power source. This can be achieved by connecting the terminal to a permanent power source, or to a rechargeable power source. For example, in some applications, the reader 10 is held on one hand of the operator, and the terminal is worn by the operator, typically on a belt worn around the operator's waist. A rechargeable battery, or a heavy-duty, long-lasting battery, can be used with the terminal since the operator can better bear the excess weight caused by the larger battery on his or her waist.

Another embodiment that achieves low power and low latency can be implemented as follows: Instead of establishing and maintaining a permanent piconet between the reader and the terminal, the piconet can be established only when needed. The terminal is placed into the Bluetooth "page scan" mode. While the terminal is in page scan mode, the terminal is constantly listening for devices that wish to establish communication with it.

Figure 3:
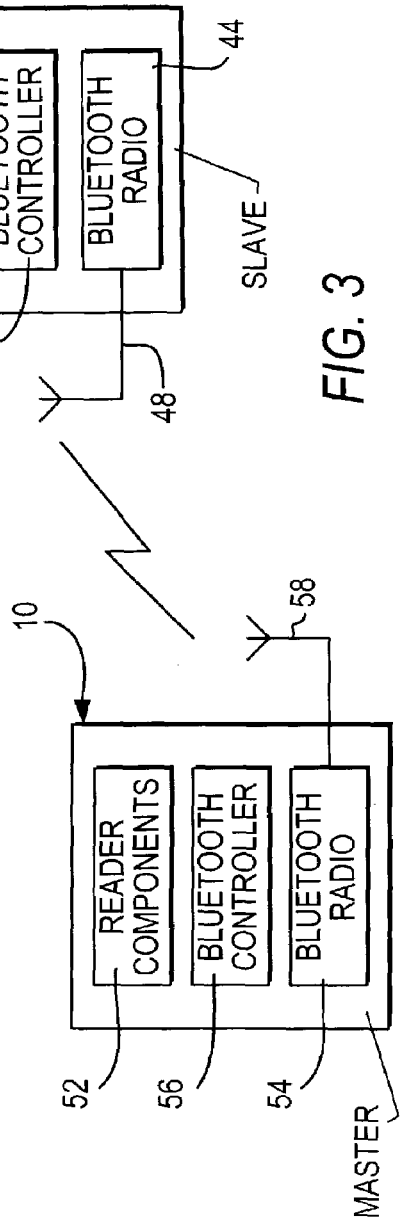
FIG. 3 is a schematic view of a second embodiment of a piconet with the reader and terminal of FIG. 1.

In this second embodiment, the radio 54 in the reader would normally be off. When the reader has data to send to the terminal, such as from a scanned symbol, the controller 56 would turn the radio 54 on and attempt to page the terminal. The page function is used to establish a piconet with a Bluetooth device that is in page scan mode. Since the terminal is always in the page scan mode, the connection will be established quickly. This can be assured by having the reader quickly scan through all possible frequencies that the terminal could be listening to. Since the reader initiated the connection, it operates as the master, and the terminal operates as the slave in the resulting piconet shown in FIG. 3. Once the piconet is established, the reader sends the data to the terminal and then immediately terminates the piconet. The reader then turns the radio 54 off and waits until the reader has more data to send.

This second embodiment requires no radio activity by the reader when there is no data to send. Hence, it is extremely low power. However, it does have a longer latency than the first embodiment, because it must go through the step of establishing a piconet before the data can be sent. As in the first embodiment, the terminal must be on continuously.

Hence, the terminal would most likely need a permanent power source, or a heavy-duty, long-lasting battery that is preferably rechargeable.

It will be understood that each of the features described above, or two or more together, may find a useful application in other types of scanners and bar code readers differing from the types described above.

While the invention has been illustrated and described as embodied in a compact bar code reader in a wireless network, it is not intended to be limited to the details shown, since various modifications and structural changes may be made without departing in any way from the spirit and scope of the present invention. In particular it will be recognized that features described in relation to one embodiment can be incorporated into other embodiments as appropriate in a manner that will be apparent to the skilled reader.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A method of minimizing power consumption of a battery-operated, wireless reader for electro-optically reading machine-readable indicia, and of minimizing latency of data generated by, and transferred from, the reader to a wireless data collection terminal remote from the reader, comprising the steps of:
   a) incorporating a controller and a radio in each of the reader and the terminal;
   b) operating the reader to read indicia in a reading mode in which data related to the indicia is generated;
   c) commanding the radio in the reader by the controller in the reader to enter a low power mode when the reader is not in the reading mode, thereby minimizing power consumption of the reader, and to automatically enter a full power mode when the reader is in the reading mode and has generated the data;
   d) periodically establishing a wireless network between the reader and the terminal over a channel, the terminal being continuously operative to periodically establish the channel;
   e) automatically transferring the data generated by the reader over the channel to the terminal in real time after the radio has entered the full power mode;
   f) acknowledging receipt of the data transferred by the reader by automatically sending an acknowledgment signal from the terminal in real time to the reader over the channel;
   g) configuring each controller and radio as Bluetooth-compatible devices in compliance with Bluetooth standard, version 1.1;
   h) operating the terminal as a master by periodically transmitting radio frequency signals from the terminal;
   i) operating the reader as a slave to establish the wireless network between the master and the slave as a piconet; and
   j) the step of automatically transferring the data generated by the reader to the terminal after the radio has entered the full power mode being performed after receipt of one of the transmitted signals from the terminal.

2. The method of claim 1, wherein the commanding step is performed by instructing the controller in the reader to issue a host control interface (HCI) command to the radio in the reader.

3. The method of claim 2, wherein the instructing step includes configuring the HCI command to maintain the low power mode for predetermined intervals of time.

4. The method of claim 1, wherein the step of acknowledging is performed by sending the acknowledgment signal from the master to the slave, and by activating an indicator at the slave to alert an operator that the acknowledgment signal has been sent.

5. A method of minimizing power consumption of a battery-operated, wireless reader for electro-optically reading machine-readable indicia, and of minimizing latency of data generated by, and transferred from, the reader to a wireless data collection terminal remote from the reader, comprising the steps of:
   a) incorporating a controller and a radio in each of the reader and the terminal;
   b) operating the reader to read indicia in a reading mode in which data related to the indicia is generated;
   c) commanding the radio in the reader by the controller in the reader to enter a low power mode when the reader is not in the reading mode, thereby minimizing power consumption of the reader, and to automatically enter a full power mode when the reader is in the reading mode and has generated the data;
   d) periodically establishing a wireless network between the reader and the terminal over a channel, the terminal being continuously operative to periodically establish the channel;
   e) automatically transferring the data generated by the reader over the channel to the terminal in real time after the radio has entered the full power mode;
   f) acknowledging receipt of the data transferred by the reader by automatically sending an acknowledgment signal from the terminal in real time to the reader over the channel;
   g) configuring each controller and radio as Bluetooth-compatible devices in compliance with Bluetooth standard, version 1.1;
   h) operating the terminal as a slave by listening for signals from the reader;
   i) operating the reader as a master by transmitting a radio frequency signal from the reader to the terminal to establish the wireless network between the master and the slave as a piconet; and
   j) the step of transmitting the radio frequency signal from the reader being performed after the reader has generated the data and entered the full power mode and after the piconet has been established.

6. An arrangement for minimizing power consumption of a battery-operated, wireless reader for electro-optically reading machine-readable indicia, and for minimizing latency of data generated by, and transferred from, the reader to a wireless data collection terminal remote from the reader, comprising:
   a) a controller and a radio in each of the reader and the terminal, each controller and radio being configured as Bluetooth-compatible devices in compliance with Bluetooth standard, version 1.1;
   b) means for actuating the reader to read indicia in a reading mode in which data related to the indicia is generated;
   c) means for commanding the radio in the reader by the controller in the reader to enter a low power mode when the reader is not in the reading mode, thereby minimizing power consumption of the reader, and to automatically enter a full power mode when the reader is in the reading mode and has generated the data;

d) means for periodically establishing a wireless network between the reader and the terminal over a channel, the terminal being continuously operative to periodically establish the channel;

e) means for automatically transferring the data generated by the reader over the channel to the terminal in real time after the radio has entered the full power mode;

f) means for acknowledging receipt of the data transferred by the reader by automatically sending an acknowledgment signal from the terminal in real time to the reader over the channel;

g) the terminal being operated as a master by periodically transmitting radio frequency signals, and the reader being operated as a slave to establish the wireless network between the master and the slave as a piconet; and h) the transferring means being operative after receipt of one of the transmitted signals by the terminal.

7. The arrangement of claim 6, wherein the controller in the reader includes means for issuing a host control interface (HCI) command to the radio in the reader.

8. The arrangement of claim 7, wherein the HCI command includes configuration information to maintain the low power mode for predetermined intervals of time.

9. The arrangement of claim 6, wherein the controller in the reader sends the acknowledgment signal to the terminal to signify receipt of the data at the master, and wherein the terminal has an indicator to alert an operator that the acknowledgment signal has been sent.

10. An arrangement for minimizing power consumption of a battery-operated, wireless reader for electro-optically reading machine-readable indicia, and for minimizing latency of data generated by, and transferred from, the reader to a wireless data collection terminal remote from the reader, comprising:

a) a controller and a radio in each of the reader and the terminal, each controller and radio being configured as Bluetooth-compatible devices in compliance with Bluetooth standard, version 1.1;

b) means for actuating the reader to read indicia in a reading mode in which data related to the indicia is generated;

c) means for commanding the radio in the reader by the controller in the reader to enter a low power mode when the reader is not in the reading mode, thereby minimizing power consumption of the reader, and to automatically enter a full power mode when the reader is in the reading mode and has generated the data;

d) means for periodically establishing a wireless network between the reader and the terminal over a channel, the terminal being continuously operative to periodically establish the channel;

e) means for automatically transferring the data generated by the reader over the channel to the terminal in real time after the radio has entered the full power mode;

f) means for acknowledging receipt of the data transferred by the reader by automatically sending an acknowledgment signal from the terminal in real time to the reader over the channel;

g) the terminal being operated as a slave by listening for a signal from the reader, and the reader being operated as a master by transmitting a radio frequency signal from the reader to the terminal to establish the wireless network between the master and the slave as a piconet; and h) the radio frequency signal being transmitted by the reader after the reader has generated the data and entered the full power mode and after the piconet has been established.

11. A method of minimizing power consumption of a battery-operated, wireless reader for electro-optically reading machine-readable indicia, and of minimizing latency of data generated by, and transferred from, the reader to a wireless data collection terminal remote from the reader, the method comprising the steps of:

a) periodically establishing a wireless network over a channel between the reader and the terminal by incorporating a controller and a radio in each of the reader and the terminal;

b) operating the terminal as a master by periodically transmitting radio frequency signals from the terminal and listening for radio frequency responses, the terminal being continuously operative to periodically establish the channel;

c) operating the reader to read indicia in a reading mode in which data related to the indicia is generated;

d) commanding the radio in the reader by the controller in the reader to enter a low power mode when the reader is not in the reading mode, thereby minimizing power consumption of the reader, and to automatically enter a full power mode when the reader is in the reading mode and has generated the data;

e) operating the reader as a slave to establish the wireless network between the master and the slave as a piconet by receiving the signals transmitted by the master, and by automatically transferring the data generated by the reader to the master in real time after receipt of one of the transmitted signals and after the radio has entered the full power mode;

f) acknowledging receipt of the data transferred by the reader by automatically sending an acknowledgment signal from the terminal in real time to the reader over the channel; and g) configuring each controller and radio as a Bluetooth-compatible device in compliance with Bluetooth standard, version 1.1.

12. The method of claim 11, wherein the commanding step is performed by instructing the controller in the reader to issue a host control interface (HCI) command to the radio in the reader.

13. The method of claim 12, wherein the instructing step includes configuring the HCI command to maintain the low power mode for predetermined intervals of time.

14. The method of claim 11, wherein the step of acknowledging is performed by sending the acknowledgment signal from the master to the slave, and by activating an indicator at the slave to alert an operator that the acknowledgment signal has been sent.

* * * * *